UNITED STATES PATENT OFFICE.

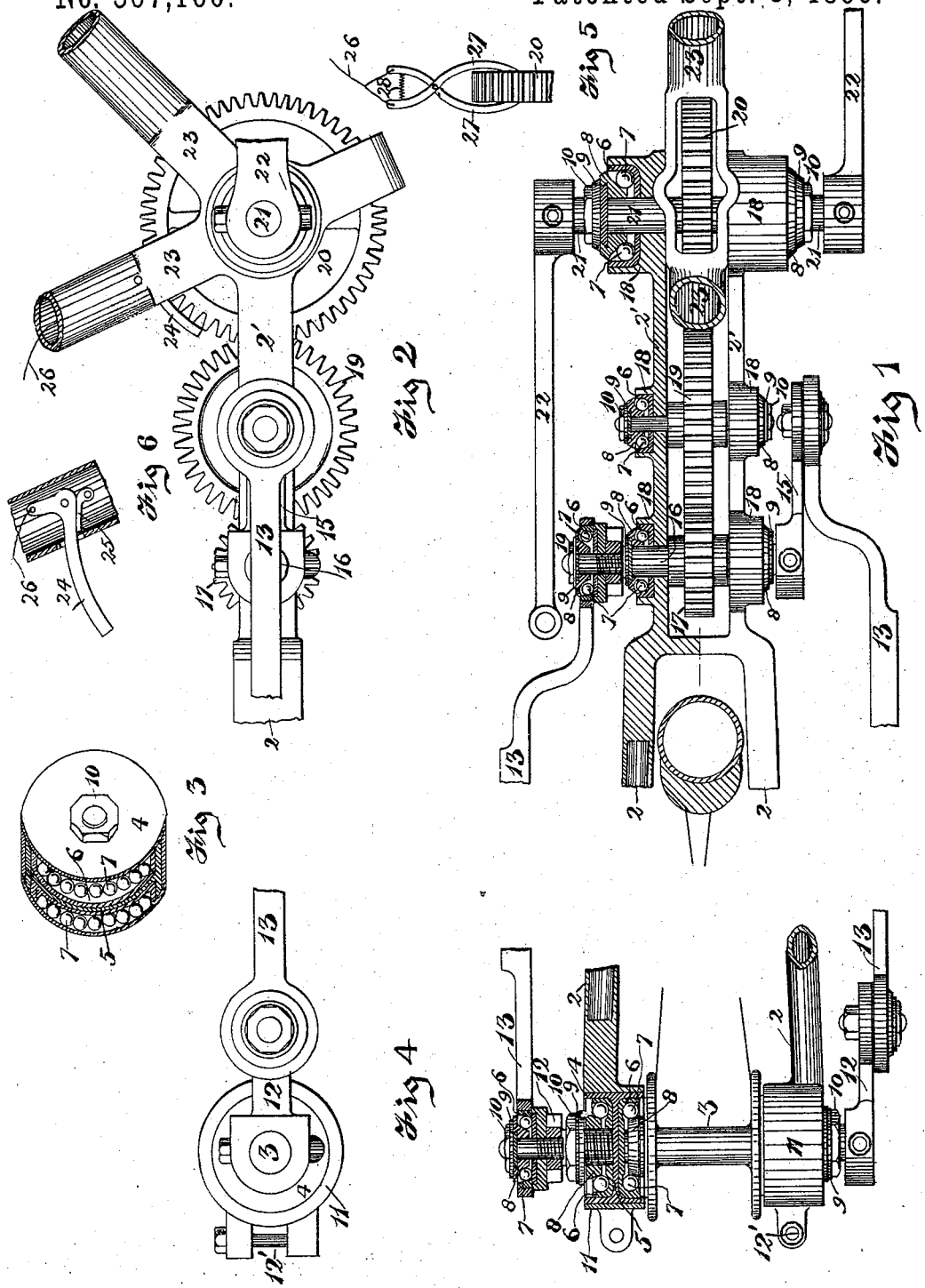

ALMY L. PEIRCE, OF PITTSBURG, PENNSYLVANIA, ASSIGNOR, BY MESNE ASSIGNMENTS, TO THE U. S. CYCLE IMPROVEMENT COMPANY, OF SAME PLACE.

VELOCIPEDE.

SPECIFICATION forming part of Letters Patent No. 567,160, dated September 8, 1896.

Application filed September 27, 1895. Serial No. 563,885. (No model.)

*To all whom it may concern:*

Be it known that I, ALMY L. PEIRCE, a citizen of the United States, residing at Pittsburg, in the county of Allegheny and State of Pennsylvania, have invented or discovered a new and useful Improvement in Velocipedes, of which the following is a specification.

In the accompanying drawings, which make part of this specification, Figure 1 is a half plan and half horizontal section of the driving-gear, frame, bearings, coupling-rods, and cranks of my improved bicycle. Fig. 2 is a side elevation of the gears and adjacent supporting-frame. Fig. 3 is a perspective of my double-row ball-bearing. Fig. 4 is a broken side view of that portion of the frame in which the double ball-bearing is set. Fig. 5 is a detail of one style of brake, and Fig. 6 of another style.

My invention, generally stated, relates to improvements in the bottom stays of the frame whereby the rear wheel may be inserted between spring-forks and in the ball-bearing boxes which may be slipped over the ends of the rear axle which is fast in the wheel and which boxes may be clamped in the spring-forks.

In the accompanying drawings, which make part of this specification, 2 2 are the tubular forks of the rear part of a horizontal frame containing the bearings for the shaft 3 of the driving-wheel A. The rear end of each of these forks is provided with a box 4, made into halves by a web 5. In each of these halves is inserted a cup 6, containing balls 7 7. These balls are held in position on the inside by a conical washer 8, and on the outside by a conical washer 9, drawn down by a flanged conical nut 10, threaded on shaft 3, and as the parts become worn this nut will tighten them up.

The driving-wheel A being fast on shaft 3, to set the same in position one end of the shaft 3 is inserted in split spring-ring 11, through the opening therein, as seen in Fig. 4. After the axle is in position the ball-bearing box (seen in Fig. 3) is inserted in the ring 11 and the ring drawn together by bolt 12'. At all the other bearings similar cups 6 6 are inserted in suitable sockets and the balls 7 7 held in place by conical washers 9 9 and nuts 10 10.

Upon the ends of shaft 3 are cranks 12 12, connecting by coupling-rods 13 13 with cranks 15 15 on shaft 16 of small gear 17, the members of each pair of cranks being set at right angles to its mate to avoid dead-centers. The coupling-rods 13 13 are bent inwardly to give the machine a narrow tread.

The bearings of shaft 16 are set in a forged part of the horizontal frame having two forks 2' 2', to which the tubular forks 2 2 are welded. This part of the frame contains bearings for all three gear-wheels, having three sockets 18 18 on each of the forks for cups 6 6. Gear 17 meshes into idler 19, and this in turn into larger gear 20, which is fast on pedal-shaft 21, having cranks 22 22 and suitable pedals. (Not shown.) By the ordinary forks of the frame 23 23 the forward end of the horizontal frame is supported, and the rear end by the ordinary forks (not shown) leading to the saddle. In one of said tubular forks 23 I pivot a brake 24, normally raised by spring 25, but having a wire or rod 26 attached to a lug on said brake and adapted to pull it down into contact with outer surfaces of teeth on gear-wheel 20, as seen in Figs. 2 and 6. In Fig. 5 is seen a tong-shaped brake, the legs 27 27 of which are ordinarily spread by spring 28, but adapted to be brought into contact with the sides of gear 20 by pulling cord 26.

The operation of the parts is too obvious to need a detailed description.

My gears may be of aluminium, rawhide, or any suitable material.

Having described my invention, I claim—

In velocipedes the combination of a driving-wheel fast on its axle; a forked bottom stay having split spring-rings at its rear ends, through the split in which rings the axle may be inserted and clamped and a ball-bearing box for double rows of balls, separated into two compartments by a wall extending clear across the same, said box being adapted to be slipped on and over the end of the set axle and clamped in position inside of the split spring-rings.

In testimony whereof I have hereunto set my hand this 24th day of September, A. D. 1895.

ALMY L. PEIRCE.

Witnesses:
M. K. COSTER,
WM. L. PIERCE.